US008934475B1

(12) United States Patent
Wu et al.

(10) Patent No.: US 8,934,475 B1
(45) Date of Patent: Jan. 13, 2015

(54) DISTRIBUTED SIP-BASED TRANSFER FEATURE

(75) Inventors: Liang Wu, Frisco, TX (US); Jiahe Zhuang, Allen, TX (US); Henry Chen, Plano, TX (US); Michael H. McClung, Ruckersville, VA (US); Jeffery Sanders, Cocoa, FL (US)

(73) Assignee: Cisco Technology, Inc., San Jose, CA (US)

( * ) Notice: Subject to any disclaimer, the term of this patent is extended or adjusted under 35 U.S.C. 154(b) by 2089 days.

(21) Appl. No.: 11/788,830

(22) Filed: Apr. 19, 2007

(51) Int. Cl.
*H04L 12/66* (2006.01)

(52) U.S. Cl.
USPC ........... 370/352; 370/356; 370/261; 370/355; 370/353; 370/395.25

(58) Field of Classification Search
USPC .............................. 370/352–356, 395.25, 261
See application file for complete search history.

(56) References Cited

U.S. PATENT DOCUMENTS

| | | | | |
|---|---|---|---|---|
| 6,470,020 | B1 * | 10/2002 | Barker et al. ................. | 370/401 |
| 7,002,989 | B2 * | 2/2006 | Agrawal et al. ............... | 370/467 |
| 7,616,749 | B2 * | 11/2009 | Poustchi .................. | 379/211.02 |
| 7,738,445 | B2 * | 6/2010 | Ibezim et al. ................. | 370/352 |
| 2003/0051037 | A1 * | 3/2003 | Sundaram et al. ............ | 709/227 |
| 2005/0021872 | A1 * | 1/2005 | Poustchi et al. .............. | 709/250 |
| 2005/0031108 | A1 * | 2/2005 | Eshun et al. ............. | 379/201.12 |
| 2005/0141691 | A1 | 6/2005 | Wengrovitz | |
| 2006/0092970 | A1 | 5/2006 | Song et al. | |
| 2006/0233176 | A1 * | 10/2006 | Stumer ...................... | 370/395.2 |
| 2006/0239253 | A1 * | 10/2006 | Gallant et al. ................ | 370/352 |
| 2006/0268754 | A1 * | 11/2006 | Ibezim et al. ................. | 370/261 |
| 2007/0043829 | A1 * | 2/2007 | Dua ............................. | 709/219 |
| 2007/0047529 | A1 * | 3/2007 | Ricciardi et al. ............. | 370/356 |
| 2007/0058639 | A1 * | 3/2007 | Khan ....................... | 370/395.52 |
| 2007/0165605 | A1 * | 7/2007 | Nguyen et al. ................ | 370/352 |
| 2007/0288562 | A1 * | 12/2007 | Shaffer et al. ................ | 709/204 |
| 2008/0043721 | A1 * | 2/2008 | Kumarasamy et al. ....... | 370/352 |
| 2008/0175229 | A1 * | 7/2008 | Lee ............................... | 370/352 |
| 2008/0186954 | A1 * | 8/2008 | Kumarasamy et al. ....... | 370/352 |
| 2008/0187127 | A1 * | 8/2008 | Cai ........................... | 379/265.11 |

OTHER PUBLICATIONS

R. Sparks, et al., "Session Initiation Protocol Call Control—Transfer draft-ietf-sipping-cc-transfer-06", Mar. 5, 2006, 55 pages.
J. Rosenberg, et al., "SIP: Session Initiation Protocol", RFC #3261; Network Working Group, Jun. 2002, 252 pages.

\* cited by examiner

*Primary Examiner* — Khaled Kassim
(74) *Attorney, Agent, or Firm* — Parker Ibrahim & Berg LLC; James M. Behmke; Stephen D. LeBarron

(57) ABSTRACT

In one embodiment, a method can include: (i) routing a primary call from a transferor to a transferee; (ii) routing a consultation call from the transferor to a transfer target; and (iii) forwarding a sequence of session initiation protocol (SIP) messages to a third-party device for SIP media renegotiation for transferring between the transfer target and the transferee.

17 Claims, 7 Drawing Sheets

DISTRIBUTED SIP-BASED TRANSFER FEATURE

TECHNICAL FIELD

The present disclosure relates generally to call transferring in a distributed call control system.

BACKGROUND

Call processing systems, including voice over Internet protocol (VoIP), may utilize session initiation protocol (SIP). However, fully distributed transfer features typically rely on some non-mandatory SIP messages and/or headers, such as REFER/refer to, INVITE with replace, etc., to complete the transfer.

Unfortunately, these non-mandatory SIP methods/headers may not be supported by third-party devices. Further, if such support by third-party devices is declared, the functionalities may not be as desired by a particular phone system. Accordingly, the transfer feature may not work properly, or at all, resulting in interoperation and/or integration problems.

DESCRIPTION OF EXAMPLE EMBODIMENTS

Overview

Figure 1:
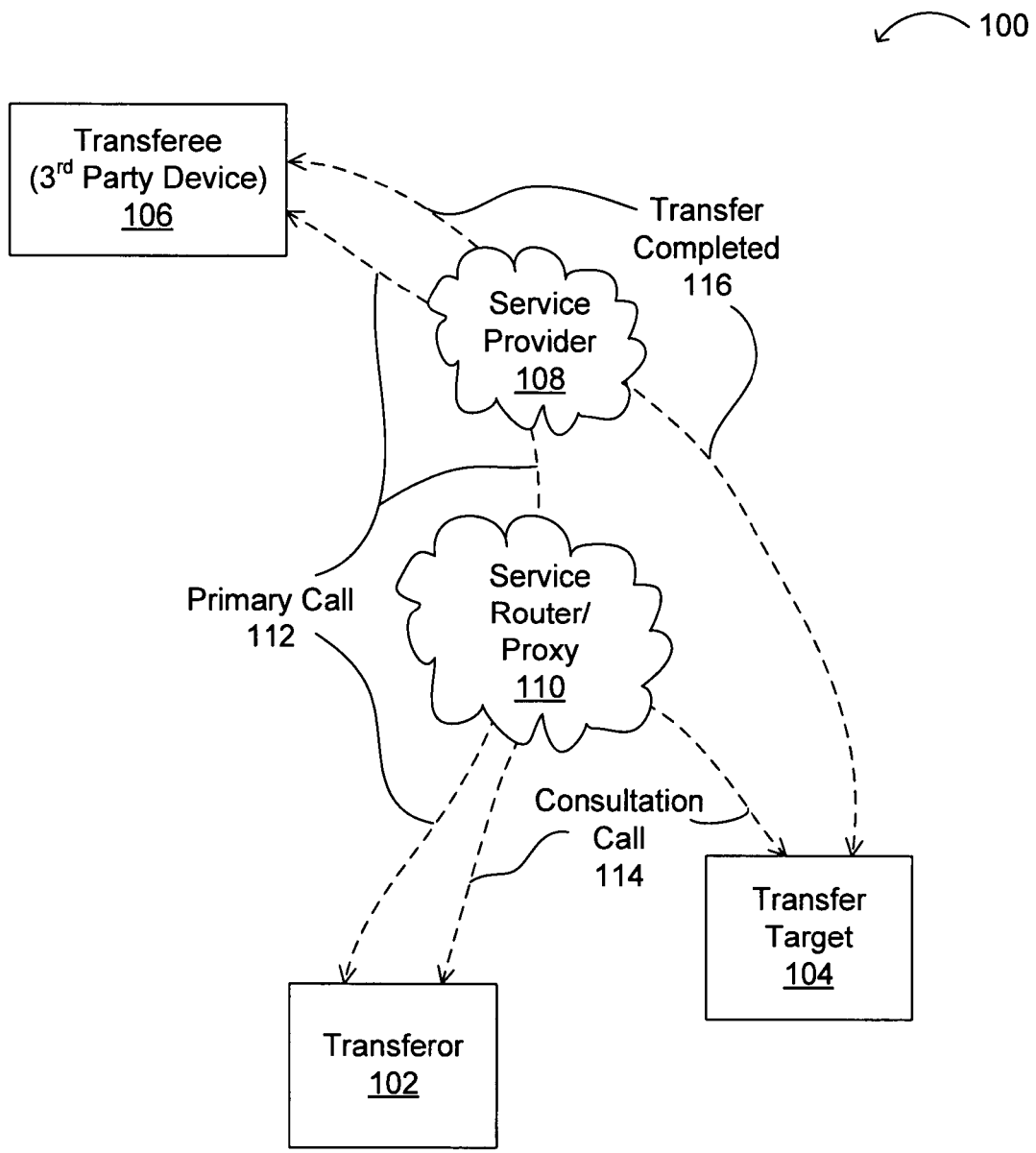
FIG. 1 illustrates an example attended transfer arrangement.

In one embodiment, a method can include: (i) routing a primary call from a transferor to a transferee; (ii) routing a consultation call from the transferor to a transfer target; and (iii) forwarding a sequence of session initiation protocol (SIP) messages to a third-party device for SIP media renegotiation for transferring between the transfer target and the transferee.

In one embodiment, logic encoded in one or more tangible media for execution may be operable when executed to: (i) route a primary call from a transferor to a transferee; (ii) route a consultation call from the transferor to a transfer target; and (iii) forward a sequence of SIP messages to a third-party device for SIP media renegotiation for transfer between the transfer target and the transferee.

Example Embodiments

In particular embodiments, interoperation/integration with third-party end user devices (e.g., IP phones) can be accommodated, and may be implemented using a fully distributed transfer feature. Further, distributed party call control (DPCC) methods can be used without a gateway, in particular embodiments. In addition to a distributed call control model, particular embodiments may also be applicable to call control systems utilizing a centralized call processing model.

Accordingly, particular embodiments can utilize DPCC to address session initiation protocol (SIP) endpoint device interoperability limitations. Such DPCC usage can allow for interoperability with devices that may not utilize transfer features suggested by SIP RFC 3261, as well as related draft proposals (see, e.g., http://tools.ietf.org/id/draft-ietf-sipping-cc-transfer-06.txt, all relevant portions of which are incorporated by reference herein). RFC 3261 is an IETF (Internet Engineering Task Force) protocol, and all relevant portions of RFC 3261 are also incorporated by reference herein.

Generally, a typical transfer feature can involve three devices or phones: (i) a transferor; (ii) a transferee; and (iii) a transfer target. In particular embodiments, the transferee and/or transfer target can be a third-party SIP endpoint or device. In particular embodiments, communication with third-party SIP devices can be performed with a minimal set of SIP methods, messages, and/or headers. Generally, when a third-party device is configured to understand an INVITE SIP message, and related mandatory headers (e.g., the minimum requirement for an SIP device), the transfer feature can appropriately function in particular embodiments.

In SIP, the RE-INVITE message can be used to modify particular media, and change/refresh a target. Further, DPCC may utilize the basic SIP RE-INVITE method with related headers to communicate with any SIP device when the device's peer party is changed (e.g., media target, IDs, etc.). Thus in particular embodiments, the DPCC method can be utilized to change/modify the session properties.

In particular embodiments, the transferor may make two calls: (i) a primary call between the transferor and the transferee; and (ii) a consultation call, which can be a call between the transferor and the transfer target. The consultation call may be in a ringing state, or a connected (i.e., attended) state. Thus after completion of the transfer, the transferee may be in a ringing state with the transfer target for unattended transfer, or the transferee may talk to the transfer target for an attended transfer.

When the transferor transfers the transferee to the transfer target, the third-party device (either transferee or transfer target) may receive an SIP RE-INVITE message, together with related headers. Accordingly, the transfer feature may be fully functional without non-mandatory methods, messages, and/or headers, and this may apply to both attended and unattended transfer cases. Further, either the transferee or transfer target may be a third party device. Thus in particular embodiments, a basic SIP RE-INVITE message for SIP media renegotiation, with related headers, may be required to complete a transfer.

Referring now to FIG. 1, an example attended transfer arrangement is shown and indicated by the general reference character 100. Transferor 102 can place primary call 112 to transferee (e.g., a third-party device) 106 via service router/proxy 110 and service provider 108. Service router/proxy 110 can be a Linksys system and/or solution, for example. Further, service provider 108 can be an Internet telephony service provider (ITSP). Consultation call 114 can be routed between transferor 102 and transfer target 104 via service router/proxy 110. Finally, transfer 116 can be completed between transfer target 104 and transferee 106 via service provider 108.

Transfer features may reside on service router/proxy 110 (e.g., a Linksys system and/or solution) in some embodiments. However, such features may also be implemented on a plain old telephone service (POTS) system and/or gateway. Further, any SIP client, endpoint, or user agent, such as any suitable SIP device that terminates media, can be utilized in particular embodiments. For example, each of transferor 102, transferee 106, and transfer target 104 can be SIP endpoints.

Primarily, transfer feature logic can reside on SIP endpoints, and not on a proxy, in particular embodiments. However, third-party devices (e.g., POTS phone gateways, and other SIP user agents) can participate in the feature without requiring special feature logic or proprietary signaling extensions.

Figure 2:
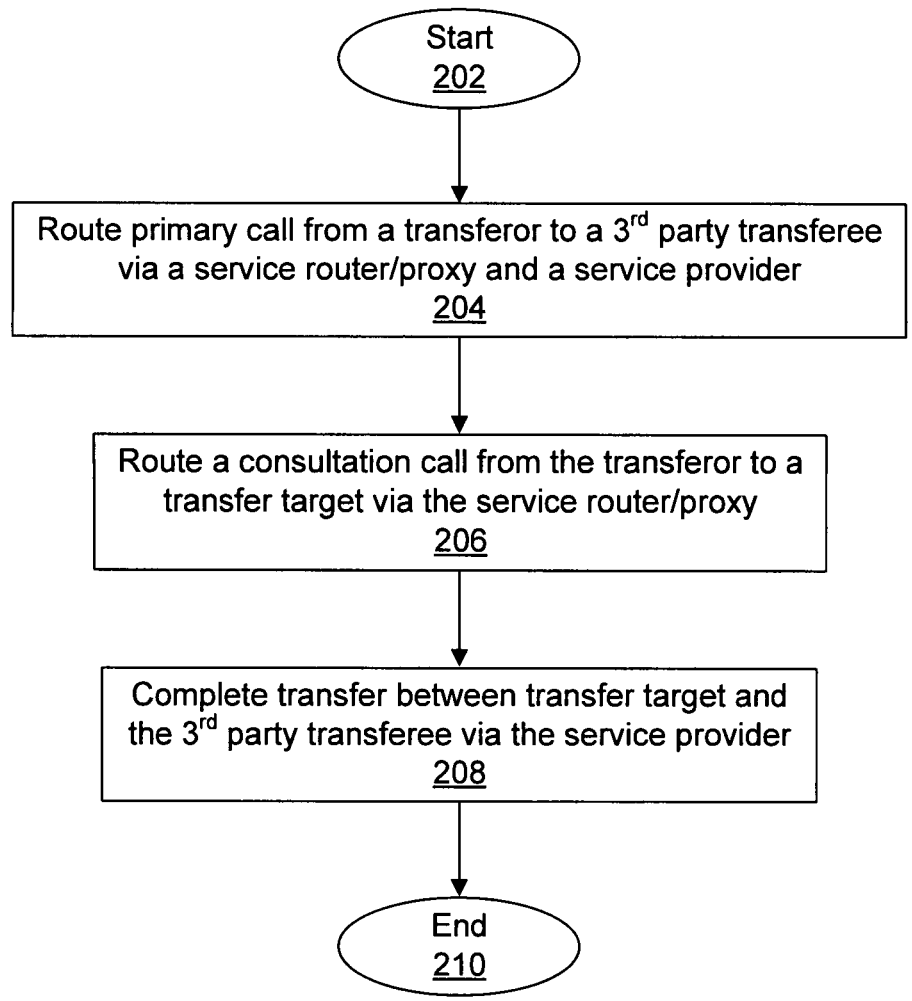
FIG. 2 illustrates an example flow for attended transfer.

Referring now to FIG. 2, an example flow for attended transfer is shown and indicated by the general reference character 200. The flow can begin (202), and a primary call can be routed from a transferor to a third-party transferee via a service router/proxy and a service provider (204). Next, a consultation call can be routed from the transferor to a transfer target via the service router/proxy (206). Then, a transfer can be completed between the transfer target and the third-party transferee via the service provider (208), and the flow can complete (210). Thus after transfer completion, the transferee may talk with the transfer target.

Figure 3:
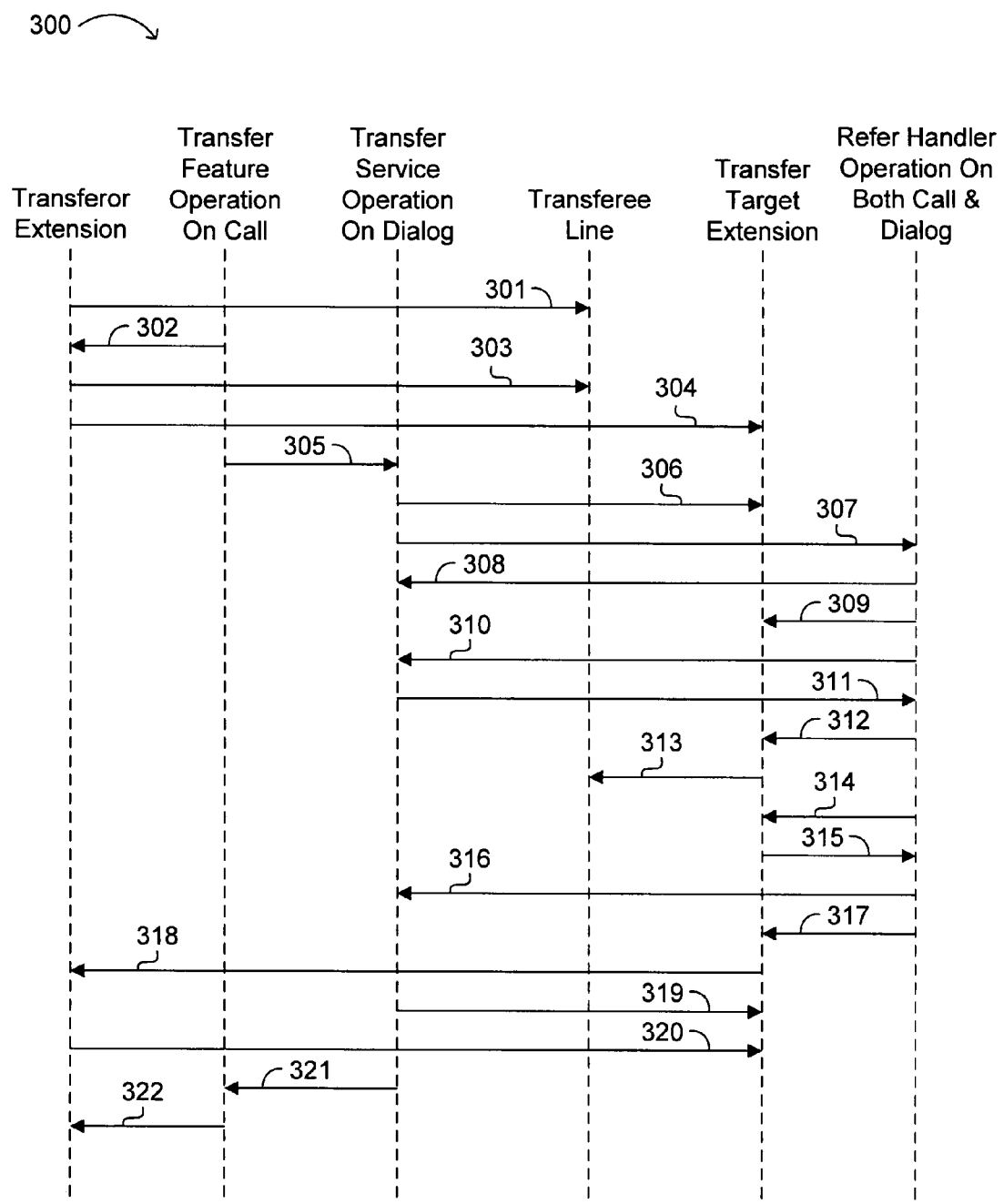
FIG. 3 illustrates an example attended transfer detailed flow.

Referring now to FIG. 3, an example attended transfer detailed flow is shown and indicated by the general reference character 300. In 301, an INVITE message can be sent between a transferor extension (e.g., a Linksys One Phone) and a transferee line (e.g., a third-party phone). In 302, a new call can be made from the transfer feature operation on call. For example, this new call (302) can be in response to the user of the transferor device invoking the transfer feature, and placing a consultation call to the transfer target. Also, the transfer feature can reside on the transferor extension in particular embodiments. In 303, an INVITE send only hold command can be sent to the transferee line. For example, message 303 may be a standard SIP RE-INVITE message for purposes of holding the call in progress. Further, such INVITE messages can include multi-message sequences (e.g., INVITE/200/OK) in accordance with the SIP standard. In 304, an INVITE can be sent from the transferor extension to the transfer target extension (e.g., a Linksys One Phone), representing a consultation call in particular embodiments. In 305, a transfer request can be made from a transfer service operation, such as in response to a transfer completion request by the user after the consultation call is complete. Also, the transfer service can reside on the transferor extension in particular embodiments. In 306, an INVITE can be sent from the transfer service operation on dialog to the transfer target extension.

In 307, a refer-to-transfer target message can be sent from the transfer service operation to a refer handler operation on both call and dialog. For example, DPCC can be utilized for the refer handler operation, which may reside on the transfer target extension. In 308, an acceptance can be returned. In 309, a new call/dialog can be sent from the refer handler operation to the transfer target extension. In 310, a NOTIFY message can be sent from the handler operation to the transfer service operation, and can indicate that the REFER request is proceeding. In 311, an OK can be returned for the NOTIFY message. In 312, a command request by feature logic to the dialog to send an INVITE message can be made (e.g., sent from the refer handler operation to the transfer target extension). For example, this command request (312) can affect media manipulation that may be required to transfer the call from between the transferor and transferee, to between the transferee and the transfer target. In 313, a RE-INVITE can be sent from the transfer target extension to the transferee line. In 314, a switch call dialog can be sent from the refer handler operation to the transfer target extension.

In 315, an acknowledgement can be sent to a call dialog switch to manipulate the user interface. In 316, a NOTIFY message can be sent from the handler operation to the transfer service operation. For example, this NOTIFY message can indicate the REFER request has successfully completed. In 317, a disconnect can be sent to the transfer target extension. In 318, a BYE message can be sent from the transfer target extension to the transferor extension to terminate a session. In 319, an OK response to the NOTIFY message can be sent from the transfer service operation to the transfer target extension. In 320, a BYE message can be sent from a transferor extension to the transfer target extension in order to terminate the REFER dialog session. In 321, an OK response can be sent from the transfer service operation to the transfer feature operation on call. And in 322, a clear call can be sent from the transfer feature operation on call to the transferor extension. Generally, the messages shown in FIG. 3 may be considered "mandatory" in particular call transfer arrangements, save the "REFER" SIP extension message, for example. Further, only such mandatory SIP messages may be sent or received from a third-party device (e.g., transferee line in FIG. 3) for call transfer in particular embodiments.

Figure 4:
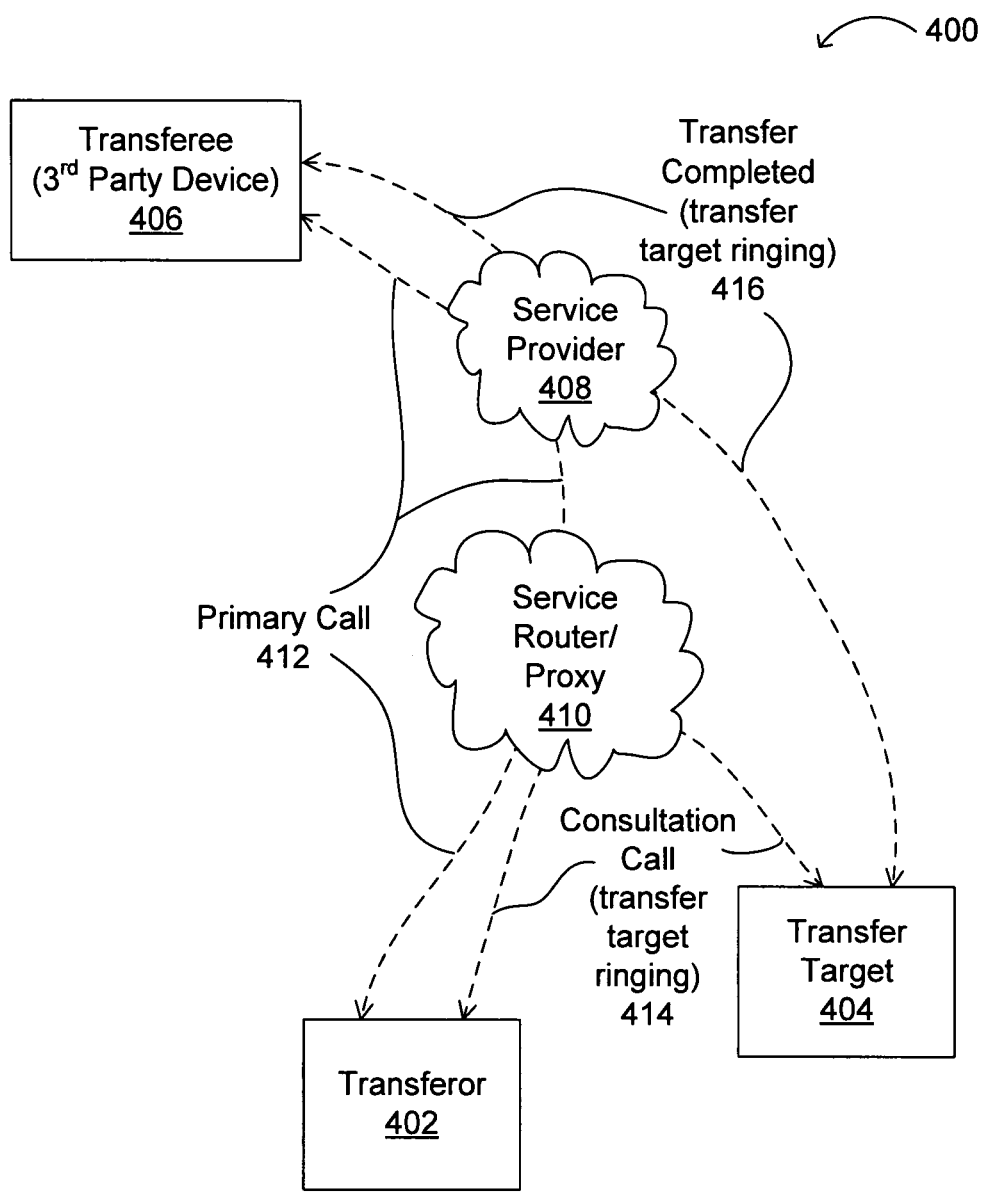
FIG. 4 illustrates an example unattended transfer arrangement.

Referring now to FIG. 4, an example unattended transfer arrangement is shown and indicated by the general reference character 400. Transferor 402 can place primary call 412 to transferee (e.g., a third-party device) 406 via service router/proxy 410 and service provider 408. Service router/proxy 410 can be a Linksys system and/or solution, for example. Further, service provider 408 can be an ITSP. Consultation call 414, where the transfer target is ringing, can be routed between transferor 402 and transfer target 404 via service router/proxy 410. Finally, transfer 416, where the transfer target is ringing, can be completed between transfer target 404 and transferee 406 via service provider 408. For example, each of transferor 402, transferee 406, and transfer target 404 can be SIP endpoints. Thus after transfer completion, the transferee may ring the transfer target.

Figure 5:
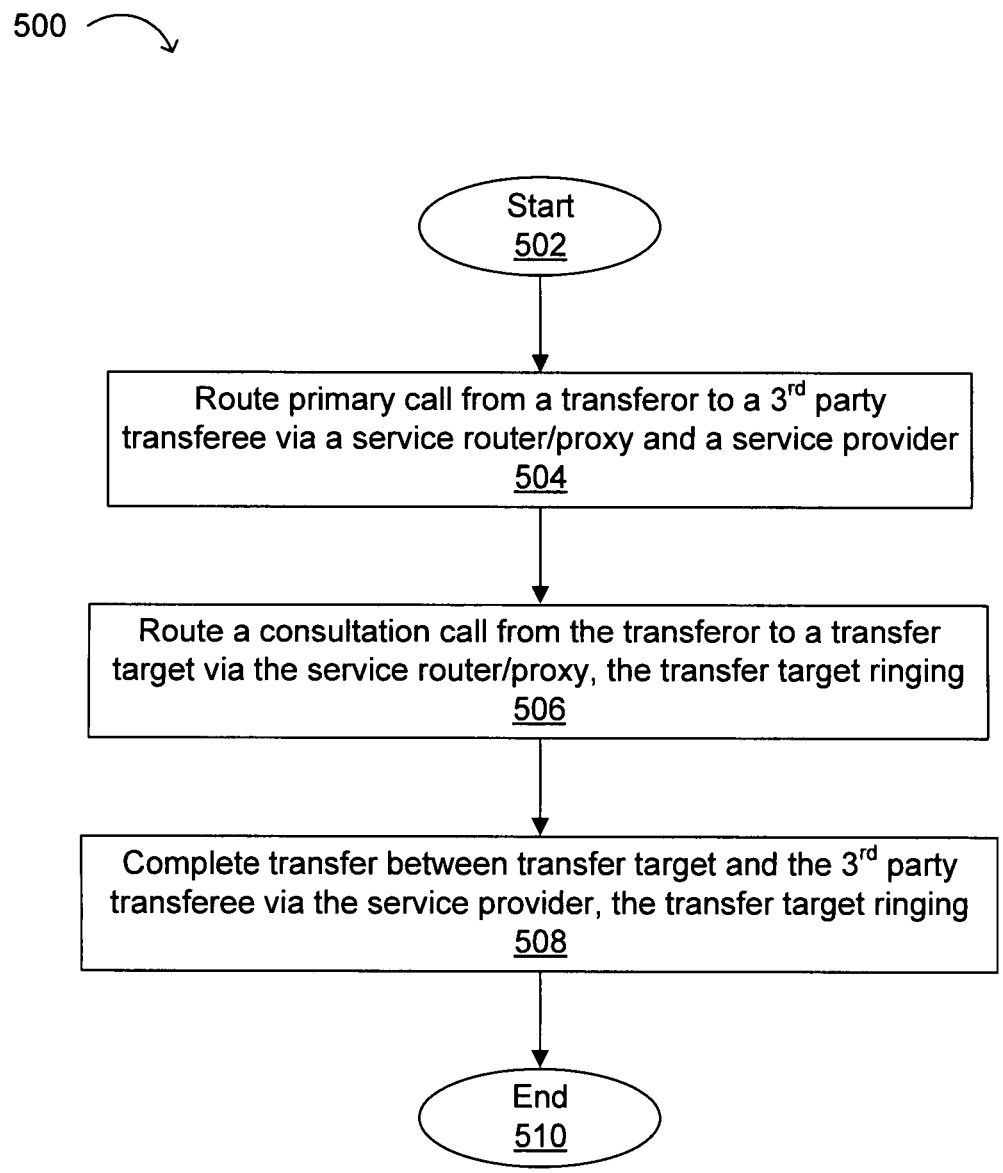
FIG. 5 illustrates an example flow for unattended transfer.

Referring now to FIG. 5, an example flow for unattended transfer is shown and indicated by the general reference character 500. The flow can begin (502), and a primary call can be routed from a transferor to a third-party transferee via a service router/proxy and a service provider (504). Next, a consultation call can be routed from the transferor to a transfer target via the service router/proxy, where the transfer target is ringing (506). Then, a transfer can be completed between the transfer target and the third-party transferee via the service provider, where the transfer target is ringing (508), and the flow can complete (510).

Figure 6:
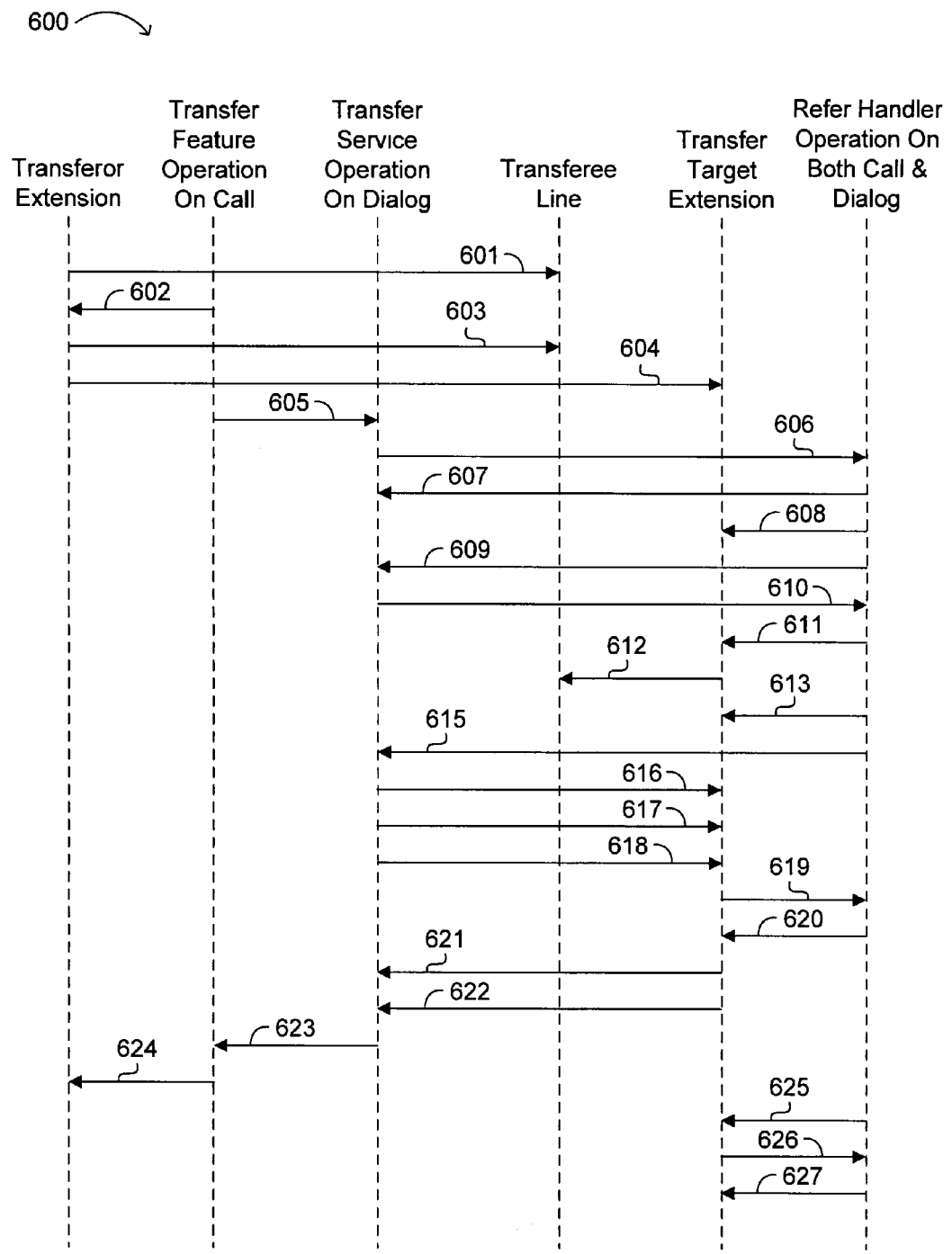
FIG. 6 illustrates an example unattended transfer detailed flow.

Referring now to FIG. 6, an example unattended transfer detailed flow is shown and indicated by the general reference character 600. In 601, an INVITE message can be sent between the transferor extension (e.g., a Linksys One Phone) and the transferee line (e.g., a third-party phone). In 602, a new call can be made from the transfer feature operation on call, where the transfer feature may reside on the transferor extension or phone. For example, this new call (602) can be in response to the user of the transferor device invoking the transfer feature, and placing a consultation call to the transfer target. In 603, an INVITE send only hold command can be sent to the transferee line. For example, message 603 may be a standard SIP RE-INVITE message for purposes of holding the call in progress. Further, such INVITE messages can include multi-message sequences (e.g., INVITE/200/OK) in accordance with the SIP standard. In 604, an INVITE can be sent from the transferor extension to a transfer target extension (e.g., a Linksys One Phone). In 605, a transfer request can be made to a transfer service operation, which can reside on the transferor extension or phone. In 606, a REFER message can be sent from the transfer service operation on dialog to a refer handler operation (e.g., using DPCC) on both call and dialog. For example, the refer handler may reside on the transfer target extension. In 607, an accepted message response to the REFER message of 606 can be sent from the refer handler operation to the transfer service operation.

In 608, a command requesting an invisible new call/dialog (e.g., not visible to a user) from feature logic to platform logic can be provided. In 609, a NOTIFY message can be sent from the refer handler operation to the transfer service operation, and can indicate that the REFER request is proceeding. In 610, an OK can be returned for the NOTIFY message. In 611, a command request by feature logic to the dialog to send an INVITE message can be made (e.g., sent from the handler operation to the transfer target extension). For example, this command request (611) can affect media manipulation that may be required to transfer the call from between the transferor and transferee, to between the transferee and the transfer target. In 612, a RE-INVITE can be sent from the transfer target extension to the transferee line. In 613, a play ring back to remote message can be sent from the refer handler operation to the transfer target extension.

In 615, a NOTIFY message can be sent from the refer handler operation to the transfer service operation. For example, the NOTIFY message (615) can indicate that the referred call is in the ringing state. In 616, an OK response to the NOTIFY message can be sent from the transfer service operation to the transfer target extension. In 617, a BYE message can be sent from the transfer service operation to the transfer target extension. In 618, a CANCEL message can be sent from the transfer service operation to the transfer target extension. In 619, a CANCEL message can be sent from the transfer target extension to the refer handler operation. In 620, a CANCEL message can be sent from the refer handler operation to the transfer target extension.

In 621, an OK response can be sent from the transfer target extension to the transfer service operation on dialog. In 622, a request terminated (for INVITE) can be sent from the transfer target extension to the transfer service operation. In 623, a transfer response (e.g., to the request in 605) can be sent from the transfer service operation to the transfer feature operation. In 624, a clear call can be sent from the transfer feature operation to the transferor extension. In 625, a call/dialog switch request can be sent from the refer handler operation to the transfer target extension. For example, this request (625) can result from the transfer target user answering the ringing call, thus affecting the sequence to complete the transfer of dialogs and calls and the building of a correct user interface. In 626, an OK for this request can be returned. And in 627, a clear local call can be sent from the refer handler operation to the transfer target extension.

In this fashion, when the transferor completes a transfer of the transferee to a transfer target, the third-party device (e.g., either the transferee or the transfer target) may receive an SIP RE-INVITE message, together with related headers. Accordingly, the transfer feature may be fully functional without non-mandatory headers and/or methods. Further, particular embodiments may be applicable to both unattended, as well as attended transfer cases.

Figure 7:
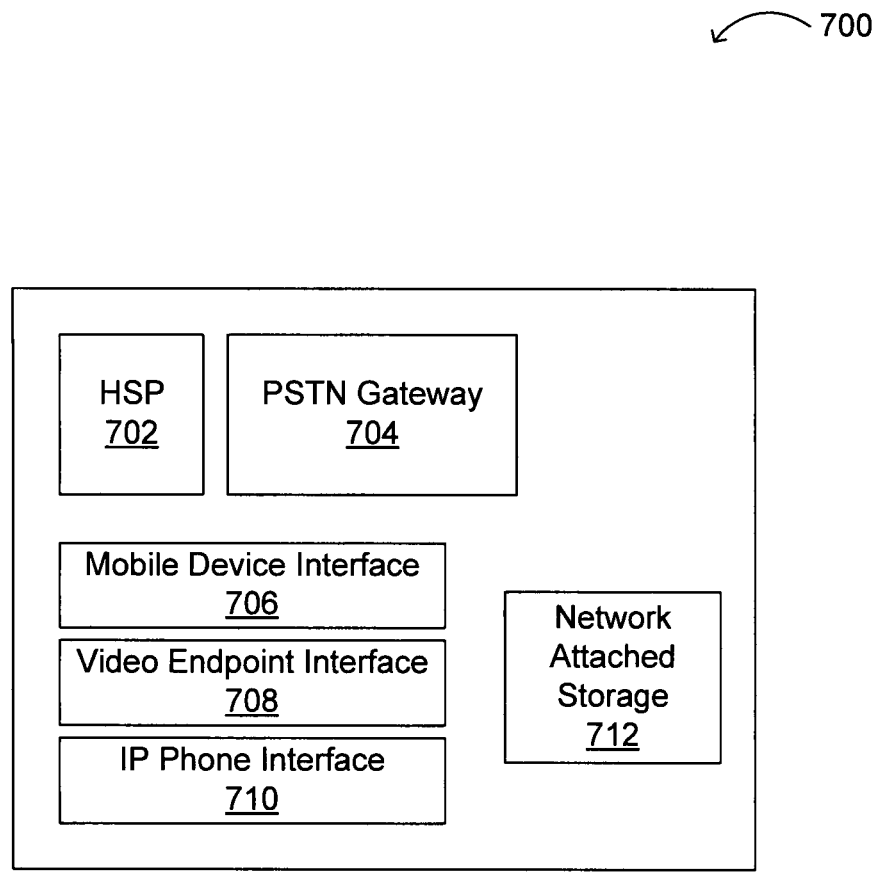
FIG. 7 illustrates example service router/proxy components.

Referring now to FIG. 7, example service router/proxy components are shown and indicated by the general reference character 700. Example components can include host signal processing (HSP) 702, public switched telephone network (PSTN) gateway 704, network attached storage 712, and interfaces for mobile devices (706), video endpoints (708), and IP phones (710).

Although the description has been described with respect to particular embodiments thereof, these particular embodiments are merely illustrative, and not restrictive. For example, while DPCC and Linksys solutions have been described, other call control approaches, router, and/or call management devices can be utilized in particular embodiments. For example, particular embodiments can accommodate the feature logic being remote from a centralized device. Also, particular embodiments can be utilized in voice messaging, auto attendant applications, conference services, as well as any suitable application that can benefit from allowing call transfers between standard SIP endpoints with minimal basic call signaling capabilities. In addition, particular embodiments may not include separate proxy elements for purposes of routing the calls being transferred. Rather, feature logic in particular embodiments can be implemented using intelligent endpoints in peer-to-peer SIP signaling arrangements, for example.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:

routing a primary call from a first device to a second device, wherein the first device is configured to use Session Initiation Protocol (SIP) mandatory and non-mandatory messages that support distributed party call control (DPCC) and the second device is configured to use SIP mandatory messages;

receiving an indication from a user of the first device invoking a transfer feature on the first device;

sending, in response to the user of the first device invoking the transfer feature on the first device, a first SIP mandatory message to the second device to place the primary call on hold;

based on sending the first SIP mandatory message to the second device, routing a consultation call from the first device to a third device using a second SIP mandatory message, wherein the third device is configured to use SIP mandatory and non-mandatory messages that support DPCC;

based on routing of the consultation call from the first device to the third device, exchanging a first sequence of SIP mandatory and non-mandatory messages between the first device and the third device, the first sequence a RE-INVITE message with related headers that initiates a transfer of the primary call from the first device to the third device using DPCC and including instructions configured to manipulate media during transference of the primary call;

based on exchanging the RE-INVITE message between the first device and the third device, sending a third SIP mandatory message from the third device to the second device, wherein the third SIP mandatory message establishes a call between the third device and the second device for transferring the primary call;

exchanging a second sequence of SIP mandatory and non-mandatory messages between the third device and the first device, the second sequence of SIP mandatory and non-mandatory messages indicating a successful establishment of the transfer and including instructions configured to terminate the consultation call and removing the first device from the primary call;

based on instructions included in the second sequence of SIP mandatory and non-mandatory messages, terminating the consultation call and removing the first device from the primary call; and routing the primary call between the third device and the second device.

2. The method of claim 1, wherein each of the first device, second device and the third device comprises a SIP endpoint.

3. The method of claim 1, wherein the second device is configured to use SIP mandatory and non-mandatory messages that support the DPCC.

4. The method of claim 3, wherein the third device is configured to use SIP messages excluding SIP non-mandatory messages.

5. The method of claim 1, wherein the SIP mandatory messages comprise SIP protocol messages that are used for basic functioning of the SIP protocol and are supported by all SIP endpoints.

6. The method of claim 1, wherein the SIP non-mandatory messages comprise SIP protocol messages that are not used for basic functioning of the SIP protocol and are unsupported by all SIP endpoints.

7. The method of claim 1, wherein the DPCC is used to modify properties of the SIP session.

8. The method of claim 1, further comprising:
communicating the RE-INVITE message with the second device when the primary call is put on hold by the first device.

9. A system comprising:
a processor; and
one or more instructions encoded in non-transitory computer-readable storage medium for execution by the processor and when executed are configured to:
route a primary call from a first device to a second device, wherein the first device is configured to use Session Initiation Protocol (SIP) mandatory and non-mandatory messages that support distributed party call control (DPCC) and the second device is configured to use SIP mandatory messages;
receive an indication from a user of the first device invoking a transfer feature on the first device;
send, in response to the user of the first device invoking the transfer feature on the first device, a first SIP mandatory message to the second device to place the primary call on hold;
based on sending the first SIP mandatory message to the second device, route a consultation call from the first device to a third device using a second SIP mandatory message, wherein the third device is configured to use SIP mandatory and non-mandatory messages that support DPCC;
based on routing of the consultation call from the first device to the third device, exchange a first sequence of SIP mandatory and non-mandatory messages between the first device and the third device, the first sequence a RE-INVITE message with related headers that initiates a transfer of the primary call from the first device to the third device using DPCC and including instructions configured to manipulate media during transference of the primary call;
based on exchanging the RE-INVITE message between the first device and the third device, send a third SIP mandatory message from the third device to the second device, wherein the third SIP mandatory message establishes a call between the third device and the second device for transferring the primary call;
exchange a second sequence of SIP mandatory and non-mandatory messages between the third device and the first device, the second sequence of SIP mandatory and non-mandatory messages indicating a successful establishment of the transfer and including instructions configured to terminate the consultation call and remove the first device from the primary call;
based on instructions included in the second sequence of SIP mandatory and non-mandatory messages, terminate the consultation call and removing the first device from the primary call; and
route the primary call between the third device and the second device.

10. The system of claim 9, wherein the primary call is configured to be routed via a service router/proxy and a service provider.

11. The system of claim 10, wherein the service provider comprises an Internet telephony service provider (ITSP).

12. The system of claim 10, wherein the service router/proxy comprises a Linksys solution.

13. The system of claim 10, wherein the service provider is configured to complete the transfer via the service provider, the service provider being coupled to the service router/proxy.

14. The system of claim 9, wherein each of the first device, second device and the third device comprises a SIP endpoint.

15. The system of claim 9, wherein the second device is configured to use SIP mandatory and non-mandatory messages that support the DPCC.

16. The system of claim 15, wherein the third device is configured to use SIP messages excluding SIP non-mandatory messages.

17. A system for routing a call, the system comprising:
means for routing a primary call from a first device to a second device, wherein the first device is configured to use Session Initiation Protocol (SIP) mandatory and non-mandatory messages that support distributed party call control (DPCC) and the second device is configured to use SIP mandatory messages;
a processor; and
instructions encoded in a non-transitory computer-readable storage medium for execution by the processor and when executed cause the processor to perform operations including:
receiving an indication from a user of the first device invoking a transfer feature on the first device;
sending, in response to the user of the first device invoking the transfer feature on the first device, a first SIP mandatory message to the second device to place the primary call on hold;
based on sending the first SIP mandatory message to the second device, routing a consultation call from the first device to a third device using a second SIP mandatory message, wherein the third device is configured to use SIP mandatory and non-mandatory messages that support DPCC;
based on routing of the consultation call from the first device to the third device, exchanging a first sequence of SIP mandatory and non-mandatory messages between the first device and the third device, the first sequence a RE-INVITE message with related headers that initiates a transfer of the primary call from the first device to the third device using DPCC and including instructions configured to manipulate media during transference of the primary call;
based on exchanging the RE-INVITE message between the first device and the third device, sending a third SIP mandatory message from the third device to the second device, wherein the third SIP mandatory message establishes a call between the third device and the second device for transferring the primary call;
exchanging a second sequence of SIP mandatory and non-mandatory messages between the third device and the first device, the second sequence of SIP mandatory and non-mandatory messages indicating a successful establishment of the transfer and including instructions configured for terminating the consultation call and removing the first device from the primary call;

based on instructions included in the second sequence of SIP mandatory and non-mandatory messages, terminating the consultation call and removing the first device from the primary call; and routing the primary call between the third device and the second device.

\* \* \* \* \*